United States Patent [19]

Moore et al.

[11] Patent Number: 4,470,891
[45] Date of Patent: Sep. 11, 1984

[54] PROCESS FOR REMOVING AVAILABLE HALOGEN FROM ANOLYTE BRINE

[75] Inventors: Sanders H. Moore; Ronald L. Dotson, both of Cleveland, Tenn.

[73] Assignee: Olin Corporation, New Haven, Conn.

[21] Appl. No.: 600,678

[22] Filed: Apr. 16, 1984

Related U.S. Application Data

[63] Continuation-in-part of Ser. No. 481,037, Mar. 31, 1983, abandoned.

[51] Int. Cl.³ .......................... C25B 1/46; C25B 1/26; C25B 1/02
[52] U.S. Cl. ....................... 204/98; 204/128; 204/129
[58] Field of Search .................. 204/98, 128, 129; 423/579, 481

[56] References Cited

U.S. PATENT DOCUMENTS

| | | | |
|---|---|---|---|
| 3,630,674 | 12/1971 | Davidson, Jr. | 23/184 |
| 3,920,529 | 11/1975 | Sprague | 204/128 |
| 3,970,528 | 7/1976 | Birngiebl et al. | 204/98 |
| 4,169,773 | 10/1979 | Lai et al. | 204/98 |
| 4,169,773 | 10/1979 | Lai et al. | 204/98 |
| 4,242,375 | 1/1981 | Lohrberg | 204/98 |
| 4,272,338 | 6/1981 | Lynch et al. | 204/98 |
| 4,272,338 | 6/1981 | Lynch et al. | 204/128 |
| 4,443,307 | 4/1984 | Moore et al. | 204/98 |

Primary Examiner—R. L. Andrews
Assistant Examiner—Terryence Chapman
Attorney, Agent, or Firm—Ralph D'Alessandro; Donald F. Clements; Thomas P. O'Day

[57] ABSTRACT

A process is disclosed for substantially reducing the dissolved halogen and hypohalite ion concentration in a recycled brine from a membrane electrolytic cell with a closed loop brine system comprising the addition of a non-sulfate generating reducing agent to the brine in a less than conventional stoichiometric molar quantity in relation to each mole of available halogen and hypohalite present in the brine after the steps of dehalogenation, precipitation and pH adjustment.

13 Claims, 1 Drawing Figure

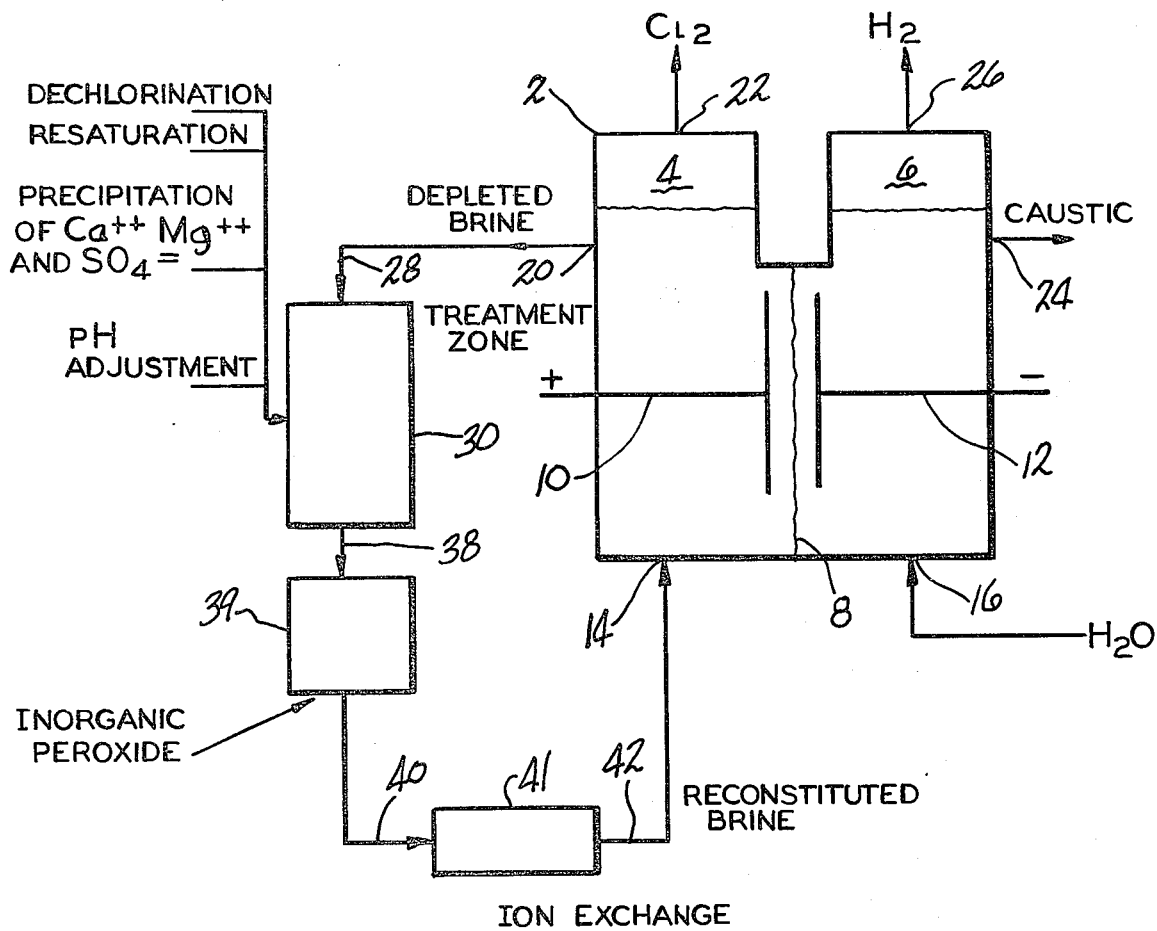

PROCESS FOR REMOVING AVAILABLE HALOGEN FROM ANOLYTE BRINE

This application is a continuation-in-part of Ser. No. 481,037, filed 3/31/83, now abandoned.

This invention relates to a process for the removal of dissolved halogen and hypohalite ions in recycled anolyte brine from an electrolytic cell. More specifically, the invention deals with the treatment of such brines in a membrane type of electrolytic cell that employs a closed loop brine processing system.

In the operation of most modern membrane type of electrolytic cells, alkali metal halide brine from the anolyte chamber is reconstituted by adding a makeup salt. Generally, the makeup salt contains small but important amounts of calcium and magnesium compounds which have detrimental effects on the permselective membrane employed in the cell. Typically, ion-exchange resins are employed in ion exchange columns to effectively reduce the amounts of these elements to operationally "safe" levels (usually about 30 to about 60 parts per billion) prior to the brine's entering the membrane cell. Additionally, recycled brine, such as alkali metal chloride brine, normally contains a small amount of "available" chlorine in the form of hypochlorite and dissolved chlorine. Even at relatively low levels, the presence of these constituents in the brine has a very detrimental effect on the calcium and magnesium compound-removing efficiency of these resins, which are also expensive to replace.

Normal dehalogenation procedures will tend to remove most of the hypohalite ions and halogen present prior to the brine's entering the ion exchange column. For example, with recycled brines from chlor-alkali cells, much of the dissolved chlorine can be recovered by flashing it off at a reduced pressure of about 0.5 atmospheres and at a temperature in excess of about 70° C. after which the residual chlorine in the brine is reduced to about 0.1 grams per liter. Still further amounts of the dissolved chlorine may be removed by blowing compressed air through a column of the brine after which the level is reduced to somewhat less than about 0.03 grams per liter. Techniques for doing this are well known in the industry.

However, in these prior art approaches not all of the available chlorine is removed unless one or more additional brine treatments are employed. One of these additional brine treatments involves the use of an inorganic peroxide. However, in so doing, a supplementary sulfur-bearing reducing agent, such as sodium thiosulfate, is required to assure complete destruction of the hypochlorite ions therein. Such a process is described in Lynch et al. U.S. Pat. No. 4,272,338, which issued on Jun. 9, 1981. Further, complete success with the method disclosed therein involves raising the solution pH to a value of between about 5 and about 11 with an inorganic base as a necessary component thereof.

The prior art brine treatments are employed in open loop brine systems which permit the purging of some impurities, such as sulfates, from the brine system by the discharge of selected quantities of brine to reduce the concentration of the impurities in the remaining brine.

An alternate brine processing system employed in Japan utilizes the addition of barium chloride to the brine to precipitate out the sulfate present because of the sulfate containing or generating reducing agent. The resulting precipitate, barium sulfate, must then be properly handled and disposed. Disposal in a landfill is normal procedure. However, barium is a potentially hazardous material that must be monitored carefully. Additionally, this type of a brine processing system still utilizes a sulfate generating reducing agent.

The advent of permselective membranes in electrolytic processes, such as in membrane chlor-alkali electrolytic cells, and tighter operating regulations that preclude the discharge of potentially hazardous waste impurities into water systems adjacent operating cell facilities have presented new brine treatment problems. The presence in the individual cells of permselective membranes which are susceptible to deterioration in membrane efficiency by the presence of sulfates in the brine in amounts greater than about 5.0 grams per liter requires new brine treatment procedures to ensure that the underlying ion-exchange purpose of the membrane is not hindered by the build-up of sulfates in the membrane. This deterioration can be aggravated by the interaction of sulfates with other impurities present in the brine, such as calcium, aluminum silicates or bridging metal oxides that form high molecular weight precipitates in the hydrophilic interstitial void spaces of the membranes, to effectively lower the critical sulfate concentration level below 5.0 grams per liter. As new membranes are introduced with higher permselectivity, the critical sulfate concentration level would be expected to drop even lower.

The foregoing problems of reducing the quantity of sulfates present in the brine and reducing the amount of potentially hazardous waste materials generated by the brine processing system are addressed in the process of the present invention wherein a non-sulfate generating reducing agent is added to the brine in a membrane electrolytic cell in a less than conventional stoichiometric molar quantity in relation to each mole of available halogen and hypohalite present in the brine in a closed loop brine system, that is a system that permits substantially no purging or discharge of brine from the system to reduce the concentration of impurities in the brine.

SUMMARY OF THE INVENTION

It is a primary object of this invention to provide an improved process for the removal of dissolved halogen and hypohalite ions from recycled brine employed in the membrane electrolytic production of alkali metal hydroxide.

It is another object of the present invention to reduce the materials handling problems required to remove the available chlorine and sulfates from the recycled brine system.

It is a feature of the present invention that hydrogen peroxide is added to a recycled brine in a closed loop membrane electrolytic cell system in a ratio of from about 0.15 to about 0.80 moles of hydrogen peroxide per mole of combined dissolved halogen and hypohalite ions present in the brine.

It is another feature of the present invention that a non-sulfate generating reducing agent is employed to remove the available chlorine from the recycled anolyte brine in a membrane chlor-alkali electrolytic cell system.

It is an advantage of the present invention that deterioration in membrane efficiency is avoided because of the reduced level of sulfates present in the membrane cell brine.

It is another advantage of the present invention that the need for the addition of a sulfur-bearing reducing agent to the brine to remove the available chlorine is eliminated.

It is a further advantage of the present invention that the cost of materials required to remove the available chlorine and sulfates from the recycled brine is reduced.

It is yet another advantage of the present invention that the generation of potentially hazardous waste materials is substantially reduced in the removal of available chlorine and sulfates from the recycled brine.

It is still another advantage of the present invention that the amount of mineral acid required in the pH adjustment step of the brine treatment process is reduced.

These and other objects, features and advantages of the present invention are provided in a process for removing dissolved halogen and hypohalite ions from a recycled alkali metal halide brine in a closed loop brine system of a membrane electrolytic cell system which comprises adding to the brine a non-sulfate generating reducing agent, such as an inorganic peroxide, in an amount equal to an operable range of between about 0.15 to about 0.80 moles, a preferred range of between about 0.15 to about 0.45 moles and a more preferred range of between about 0.2 and about 0.4 moles per mole of combined dissolved halogen and hypohalite ions present in said brine after the steps of dehalogenation, precipitation and pH adjustment. When this is done, these available halogen impurities are substantially reduced without generating sulfates which deteriorate the membrane's efficiency. This reduction of available halogen is found to be particularly advantageous when the brine is to be subsequently treated for final $Ca^{++}$ and $Mg^{++}$ removal by ion-exchange processes.

BRIEF DESCRIPTION OF THE DRAWINGS

The advantages of this invention will become apparent upon consideration of the following detailed disclosure of the invention, especially when it is taken in conjunction with the following drawings wherein:

FIG. 1 is a schematic view of an electrolytic membrane cell system in which the process of the present invention may be used to remove the available chlorine from the recycled brine.

DETAILED DESCRIPTION OF THE INVENTION

For simplicity, the process of this invention is described with respect to a sodium chloride brine. However, it is to be understood that the process of this invention is equally applicable to solutions of other alkali metal halides such as potassium chloride, sodium bromide, potassium bromide or mixtures thereof.

As schematically shown in FIG. 1, a membrane cell 2 is sealingly divided into an anolyte chamber 4 and a catholyte chamber 6 by a cationic permselective membrane 8. An anode 10 is located in the anolyte chamber 4 and a cathode 12 is positioned in the catholyte chamber 6. The sodium chloride brine is fed through inlet 14 into the anolyte chamber 4. Water is fed into the catholyte chamber 6 through inlet 16.

Voltage is applied across the cell 2 to generate an electric current in the cell electrolyte which generates chlorine on the anode surface from the brine present in the anolyte chamber 4 and generates hydrogen gas on the cathode surface from the water present in catholyte chamber 6. Chlorine gas is discharged at outlet 22.

A cationic permselective membrane 8 permits the sodium ions in the brine and a small amount of water to pass from the anolyte chamber 4 through to the catholyte chamber 6. The sodium ions and water then combine with the OH− ions formed by the discharge of hydrogen ions in the water in the catholyte chamber 6 to form a caustic solution and $H_2$ gas. The aqueous caustic solution is recovered through outlet 24, while the hydrogen gas is removed from the catholyte chamber 6 through outlet 26.

To maintain high anolyte current efficiency, some quantity of depleted brine is continuously removed from the anolyte chamber 4 through outlet 20 and conveyed via process line 28 to a treatment zone 30. This brine has a pH of between about 2 and about 6 and contains, in addition to unused salt, small quantities of "available" chlorine, comprised of a mixture of dissolved chlorine and hypochlorite ions, i.e. $Cl_2$ and $OCl^-$, as well as sodium chlorate and sodium sulfate dissolved therein. Typical values for brine removed from a membrane cell are a salt concentration of between about 100 and about 250 grams per liter, a total available chlorine concentration of up to about 10 grams per liter, sodium chlorate concentration ranging up to about 25 grams per liter and sodium sulfate concentration up to about 4 grams per liter. The amounts of these components contained in the recycled anolyte brine may vary somewhat according to the characteristics of the particular membrane cell system and brine employed.

The brine treatment zone 30 comprises the operations concerned with processing or rehabilitating the brine for reuse in the membrane cell 2. In most standard membrane cell systems where the primary products produced are chlorine, hydrogen and caustic, these operations generally comprise the steps of:
 1. dechlorination,
 2. resaturation with fresh salt,
 3. precipitation of calcium, magnesium and sulfate ions, and
 4. pH adjustment, if necessary.

After the completion of processing in the treatment zone 30, the brine is referred to as a reconstituted brine. This is conveyed from the treatment zone 30 through a process line 38 to a mixing tank 39 where the non-sulfate generating reducing agents, such as an inorganic peroxide, is preferably added to the reconstituted brine in the proportions set forth below. The treated brine then is conveyed through line 40 to an ion-exchange unit 41 where final removal of calcium and magnesium ions occurs. The polished and reconstituted brine then is conveyed through a brine line 42 to an inlet 14 in anolyte chamber 4 for reuse in the membrane cell 2.

In the preferred embodiment of the process of this invention, the removal of available chlorine by the addition of an inorganic peroxide is accomplished by a catalytic reduction of the available chlorine by the cleavage of the peroxo bond through a mechanism that is not fully understood, resulting in the consumption of greatly reduced molar peroxide quantities well below the conventional stoichiometric molar requirements. This normally also results in a reduction of the pH of the recycled brine. The peroxide is added, generally in the form of an aqueous solution, after the dechlorination, precipitation and pH adjustment steps to the recycled brine, in an amount equal to an operable range of between about 0.15 to about 0.80 moles, a preferred range of between 0.15 to about 0.45 moles and a more preferred range of between about 0.2 and about 0.4 moles of peroxide per mole of combined dissolved chlorine and hypochlorite present. Using such a low molar ratio of inorganic peroxide to total available chlorine to accomplish this substantial removal of the available chlorine is surprising and unexpected since prior experience in similar systems teaches the need for about 1 mole of hydrogen peroxide to remove an equivalent mole of available chlorine from the recycled brine.

Another potentially significant factor in the greatly reduced molar peroxide quantities well below the conventional stoichiometric molar requirements is the lower concentration of the hypohalite ions present in the brine in this particular brine treatment process at the peroxide addition step. An additional factor not to be overlooked as potentially affecting the process at the peroxide addition step is the high molar concentration of chloride ions in the brine which increases the ionic strength of the brine solution substantially to thereby decrease the water activity substantially. This, in turn, facilitates the catalytic reduction of the available chlorine by the peroxo bond activity by lowering the competition in solution with the water for the available peroxy ions and increasing the available reaction time of the peroxy ions with the hypohalite ions to effect the desired reduction.

The exact nature of the reactions involved in this reaction are not understood. It is believed that the inorganic peroxide reacts with the dissolved hypochlorite ions and chlorine in a catalyzed reaction to produce oxygen, an oxygen-containing compound of the inorganic element employed, and chloride ions in the aqueous solution as shown in equations (1) and (2), wherein $H_2O_2$ is used as the peroxide:

$$H_2O_2 + OCl^- \rightarrow O_2 + H_2O + Cl^- \quad (1)$$

$$H_2O_2 + Cl_2 \rightarrow O_2 + 2H^+ + 2Cl^- \quad (2)$$

Some of the hypochlorite content may also be consumed by conversion of the hypochlorite ions to a mixture of chlorates and chlorides as shown by equation (3):

$$3OCl^- \rightarrow ClO_3^- + 2Cl^- \quad (3)$$

It is also found that when the peroxide is added, the pH of the brine usually drops by a value of between about 0.1 and about 3.0. As will be shown below, this combined reduction of pH and available chlorine can be particularly advantageous during brine reprocessing.

Non-sulfate generating reducing agents then can be employed for addition to the mixing tank 39 shown in the process of FIG. 1 and can include oxalic acid, glyoxol, alcohol, organic peroxides and inorganic peroxides. Typical inorganic peroxides which may be employed in the process of this invention include hydrogen peroxide ($H_2O_2$), ozone, alkali metal peroxides such as potassium peroxide ($K_2O_2$), sodium peroxide ($Na_2O_2$), alkali metal superoxides such as potassium superoxide ($KO_2$), sodium superoxide ($NaO_2$) and mixtures thereof. $H_2O_2$ is the preferred inorganic peroxide.

The basic reaction conditions in this process are not especially critical. For example, the recycled brine temperature may range from about 50° to about 110° C. Further, the initial brine pH can range from about 1 to about 12 while the reaction time can be varied from about 1 to about 20 minutes. The reducing agent selected, for example peroxide, may be added directly as a liquid solution to, or bubbled through, in the case of ozone, the brine. With $H_2O_2$, the ready availability of premixed concentrated solutions which require no special mixing facilities particularly simplifies practicing the process of this invention. This adds considerable versatility to the process. The peroxide must be added to the treatment zone 30 after conventional dechlorination procedures, while addition after concentration or resaturation is preferred.

The combined reduction of pH and available halogen is particularly useful after brine resaturation and the preliminary treatments to precipitate excessive $Ca^{++}$ and $Mg^{++}$ ions. It is known that the ion-exchange resins used to polish the brine require a brine pH of no higher than about 9.5 for continuous safe use. However, as a result of the preliminary treatments to precipitate the largest part of the dissolved $Ca^{++}$ and especially the $Mg^{++}$ ions introduced by resaturation, the brine may have a pH well in excess of this value. Some quantity of a mineral acid, usually HCl, then must be added to the treatment zone 30 to reduce the pH below 9.5. With the process of this invention, the natural pH reduction caused by the $H_2O_2$ addition acts to substantially reduce the amount of mineral acid needed to achieve this result.

The cationic permselective membrane 8 which separates the anolyte chamber 4 from the catholyte chamber 6 is composed of a solid fluorocarbon polymer generally reinforced by a strain of a suitable metal or a fabric such as a polyfluoroolefin cloth, rayon or mixtures thereof.

Materials suitable for use as membranes in the process of this invention include the sulfonic acid substituted perfluorocarbon polymers of the type described in Robert Spitzer U.S. Pat. No. 4,036,714, which issued on Jul. 19, 1977; the primary amine substituted polymers described in Paul Raphael Resnick et al. U.S. Pat. No. 4,085,071, which issued on Apr. 18, 1978; the polyamine and diamine substituted polymers of the type described in Walther Gustav Grot U.S. Pat. No. 4,030,988, which issued on Jun. 21, 1977; to the carboxylic acid substituted polymers described in Yoshio Oda et al. U.S. Pat. No. 4,065,366, which issued on Dec. 27, 1977; and the mixed sulfonic acid/carboxylic acid substituted polymers described in Molnar et al. U.S. Pat. No. 4,255,240, which issued on Mar. 10, 1981. All of the teachings of these patents are incorporated herein by reference in pertinent part.

The thickness of the membrane may be in the range from about 3 to about 20 mils, and preferably from about 5 to about 10 mils. For selected membranes, a laminated inert cloth supporting material for the membrane comprised of polytetrafluoroethylene or similar inert materials may be used.

Although the aforesaid membranes appear to provide the highest overall efficiency of the operation of the process of this invention, it is to be understood that any inert hydrophilic membrane material that is capable of effecting the electrolytic production of alkali metal hydroxide from a brine containing alkali metal halides may be used.

Any suitable electrodes may be used as the anode or cathode in the electrolytic membrane cell. Typical anodes are those of graphite or a foraminous metal such as titanium or tantalum having an electroactive coating over at least a portion of the anode surface. Suitable coatings include those of a platinum group metal, platinum group metal oxide, an alloy of a platinum group metal or mixtures thereof. The term "platinum group metal" means an element of the group consisting of ruthenium, rhodium, platinum, palladium, osmium, and iridium. Also effective are anodes composed of graphite, or anodes comprised of a metal oxide coated substrate such as described in H. B. Beer U.S. Pat. No. 3,632,498, which issued on Jan. 4, 1972. When such electrodes are employed as anodes, anodic chlorine overvoltage is minimized.

Examples of materials which may be employed as the cathode are carbon steel, stainless steel, nickel, nickel molybdenum alloys, nickel vanadium alloys and Raney nickel based alloys.

The cathode and anode may each be either solid, felt, mesh, foraminous, packed bed, expanded metal, or of other structural design. Any electrode configuration capable of effecting anodic electrolytic production of $Cl_2$ or cathodic electrolytic production of caustic may be used as anodes or cathodes, respectively, in the process of this invention.

The following examples are presented to define the invention more fully without any intention of being limited thereby. All parts and percentages are by weight unless indicated otherwise.

EXAMPLE 1

A 500 ml sample of a depleted brine taken from a conventional membrane cell at a temperature of 85° C. and having the following analysis:

| | | |
|---|---|---|
| "Available Chlorine" ($Cl_2$ + NaOCl) | 8.87 grams/liter | (0.06 mole) |
| $NaClO_3$ | 21.60 grams/liter | |
| NaCl | 254.6 grams/liter | |
| pH | 4.6 | | was slowly titrated with 35 percent $H_2O_2$ while being stirred with the following results:

| Amount of $H_2O_2$ Added (ml) | "Available" Chlorine (Combined $Cl_2$/NaOCl) (gpl) | Moles ($H_2O_2$) |
|---|---|---|
| 0 | 8.87 | |
| 0.1 | 8.18 | |
| 0.2 | 7.27 | |
| 0.3 | 6.33 | |
| 0.4 | 5.46 | |
| 0.5 | 4.63 | |
| 0.6 | 3.69 | |
| 0.7 | 2.45 | |
| 0.8 | 1.98 | |
| 0.9 | 1.11 | |
| 1.0 | 0.24 | |
| 1.1 | Not Detectable | 0.0132 |

At the conclusion of the $H_2O_2$ addition, the brine composition was:

| | |
|---|---|
| 22.09 grams/liter | $NaClO_3$ |
| 256.9 grams/liter | NaCl |
| 1.7 | pH |

The molar ratio of the $H_2O_2$ added to that of the "available" chlorine originally present (0.0132/0.06) is about 0.22:1.

EXAMPLE 2

A 500 ml sample of dechlorinated brine at a temperature of 90° C. and having the following analysis:

| | | |
|---|---|---|
| Available Chlorine | 0.022 grams/liter | (0.00015 mol) |
| $NaClO_3$ | 2.50 grams/liter | |
| NaCl | 195.4 grams/liter | |
| pH | 1.2 | | was slowly titrated with 0.35 percent $H_2O_2$ while being stirred with the following results:

| Amount of $H_2O_2$ Added (ml) | "Available" Chlorine (Combined $Cl_2$/NaOCl) (gpl) | Moles ($H_2O_2$) |
|---|---|---|
| 0 | 0.022 | |
| 0.1 | 0.019 | |
| 0.2 | 0.014 | |
| 0.3 | 0.0049 | |
| 0.4 | 0.00098 | |
| 0.5 | Not Detectable | 0.00006 |

At the conclusion of the $H_2O_2$ addition, the brine composition was:

| | |
|---|---|
| Not Detectable | Available Chlorine |
| 10.71 grams/liter | $NaClO_3$ |
| 155.3 grams/liter | NaCl |
| 1.2 | pH |

The molar ratio of the $H_2O_2$ added to that of the "available" chlorine originally present (0.00006/0.00015) is about 0.4.

EXAMPLE 3

A 500 ml sample of dechlorinated reconstituted brine, said brine having been reacted with a quantity of NaOH and $Na_2CO_3$ to precipitate calcium and magnesium ions therefrom, and having a temperature of about 60° C. and the following analysis:

| | | |
|---|---|---|
| Available Chlorine | 0.00098 grams/liter | (0.00006 mol) |
| $NaClO_3$ | 1.24 grams/liter | |
| NaCl | 310.9 grams/liter | |
| pH | 9.9 | | was admixed with 0.2 ml of 0.35 percent $H_2O_2$ (molar ratio=0.4) for a period of about 10 minutes. At the conclusion of this time, the following results were obtained:

| | |
|---|---|
| Available Chlorine | Not Detectable |
| $NaClO_3$ | 1.27 grams/liter |
| NaCl | 309.3 grams/liter |
| pH | 9.3 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A process for removing an available halogen content comprised of dissolved halogen and hypohalite ions from a recycled alkali metal halide brine, in a closed loop brine system of an electrolytic membrane cell, the process comprising the steps of:
   (a) dehalogenating the brine;
   (b) precipitating out of the brine calcium, magnesium and sulfate ions;
   (c) adjusting the pH by addition of a mineral acid;
   (d) adding a non-sulfate generating reducing agent as a reducing agent in an amount equal to between about 0.15 to about 0.80 moles of reducing agent per mole of combined dissolved halogen and hypohalite ions present in the brine; and
   (e) subjecting the brine to an ion exchange treatment.

2. The process according to claim 1 further comprising resaturating the brine after the dehalogenating step prior to the precipitating step of claim 1.

3. The process according to claim 1 further comprising adding the non-sulfate generating reducing agent in an amount ranging from about 0.15 to about 0.45 moles reducing agent per mole of combined dissolved halogen and hypohalite ions present in the brine.

4. The process according to claim 1 further comprising adding the non-sulfate generating reducing agent in an amount ranging from about 0.20 to about 0.40 moles of reducing agent per mole of combined dissolved halogen and hypohalite ions present in the brine.

5. The process according to claim 4 further comprising using an inorganic peroxide as the non-sulfate generating reducing agent.

6. The process according to claim 5 wherein the inorganic peroxide is selected from the group consisting of hydrogen peroxide, ozone, sodium peroxide, sodium superoxide, potassium peroxide and potassium superoxide and mixtures thereof.

7. The process according to claim 6 wherein the inorganic peroxide is hydrogen peroxide.

8. The process according to claim 4 wherein the non-sulfate generating reducing agent is an organic peroxide.

9. The process according to claim 1 wherein the brine comprises a combined dissolved halogen and hypohalite content of up to about 10 grams per liter.

10. The process according to claim 1 wherein the temperature of said brine is between about 50° and about 110° C.

11. The process according to claim 1 wherein the pH of said brine is between about 1 and about 12.

12. The process according to claim 1 wherein said alkali metal halide in said brine is selected from the group consisting of sodium chloride, sodium bromide, potassium chloride, potassium bromide or mixtures thereof.

13. The process according to claim 12 wherein said alkali metal halide is sodium chloride.

* * * * *